US005590143A

United States Patent [19]
Takara et al.

[11] Patent Number: 5,590,143
[45] Date of Patent: Dec. 31, 1996

[54] MULTIPLE-FREQUENCY-MODULATION TYPE MODE-LOCKED LASER DEVICE

[75] Inventors: Hidehiko Takara, Yokosuka; Satoki Kawanishi, Zushi; Masatoshi Saruwatari, Yokosuka, all of Japan

[73] Assignee: Nippon Telegraph and Telephone Corporation, Tokyo, Japan

[21] Appl. No.: 398,177

[22] Filed: Mar. 2, 1995

[30] Foreign Application Priority Data

Mar. 3, 1994 [JP] Japan .................................. 6-033735

[51] Int. Cl.⁶ .......................................................... H01S 3/10
[52] U.S. Cl. ............................................... 372/28; 372/18
[58] Field of Search ............................... 372/18, 92, 70, 372/26, 28

[56] References Cited

U.S. PATENT DOCUMENTS

| | | | |
|---|---|---|---|
| 5,073,981 | 12/1991 | Giles et al. | 372/18 |
| 5,212,711 | 5/1993 | Harvey et al. | 372/18 |
| 5,274,659 | 12/1993 | Harvey et al. | 372/18 |
| 5,347,529 | 9/1994 | Noe | 372/28 |

FOREIGN PATENT DOCUMENTS

| | | |
|---|---|---|
| 2-310982 | 12/1990 | Japan . |
| 3-229478 | 10/1991 | Japan . |
| 5-75194 | 3/1993 | Japan . |
| 6-85366 | 3/1994 | Japan . |

OTHER PUBLICATIONS

S. Kawanishi et al., "100 Gbit/s, 200km optical transmission experiment using extremely low jitter PLL timing extraction and all–optical demultiplexing based on polarisation insensitive four–wave mixing", Electronics Letters, vol. 30, No. 10, May 12, 1994, pp. 800–801.

Y. Hibino et al., "Silica–Based Optical Waveguide Ring Laser Integrated With Semiconductor Laser Amplifier on Si Substrate", Electronics Letters, vol. 28, No. 20, Sep. 24, 1992, pp. 1932–1933.

K. Suzuki et al., "2.5 ps Soliton Pulse Generation at 15 GHz with Monolithically Integrated MQW–DFB–LD/MQW–EA Modulator and Dispersion Decreasing Fiber", Tech. Digest OAA '93, TuD2, pp. 314–317.

Yoshiaki Yamabayashi et al., "Picosecond Optical Sampling with LiNbO₃ Waveguide and Compressed Laser Diode Pulses", Abstracts of Spring 1988 National Convention of the Electronic Data Communications Society, B–671.

"High Speed, Mode–Locked, Tunable, Integrated Erbium Fibre Laser", R. P. Davey et al., Electronics Letters, 28(5):482–483 (1992).

"Generation Of Highly Stable 20 GHz Transform–Limited Optical Pulses From Actively Mode–Locked Er³⁺–Doped Firbe Lasers With An All–Polarisation Maintaining Ring Cavity", H. Takara et al., Electronics Letters, 28(22):2095–2096 (1992).

"GHz Transform–Limited Optical Pulse Generation and Bit–Error–Free Operation Using A Turnable, Actively Moderated Er–Doped Fibre Ring Laser", H. Takara et al., Electronics letters, 29(13):1149–1150 (1993).

*Primary Examiner*—Leon Scott, Jr.
*Attorney, Agent, or Firm*—Finnegan, Henderson, Farabow, Garrett & Dunner, L.L.P.

[57] ABSTRACT

A multiple-frequency-modulation mode-locked laser device which generates high-speed optical pulse trains and can be used as a high-speed optical pulse source in the fields of optical communications and optical measurement is presented, wherein the repetition frequency $F_{rep}$ and the pulse width $\Delta t$ are able to be controlled independently with only the laser itself.

A drive signal generation means is provided which generates a frequency-mixed drive signal mixed from at least two different frequencies $f_1(=N_1 f_r)$, $f_2(=N_2 f_r)$, . . . , which are integral multiples of the frequency spacing $f_r(=c/R)$ of the longitudinal modes of either a ring cavity or a Fabry-Perot cavity. This frequency-mixed drive signal is supplied to an optical modulation means of the cavity.

11 Claims, 12 Drawing Sheets

EMBODINENT 1 OF THE MULTIPLE-FREQUENCY-MODULATION
MODE-LOCKED LASER DEVICE OF THE PRESENT INVENTION

FIG.1
EMBODIMENT 1 OF THE MULTIPLE-FREQUENCY-MODULATION MODE-LOCKED LASER DEVICE OF THE PRESENT INVENTION

FIG.2
EMBODIMENT 2 OF THE MULTIPLE-FREQUENCY-MODULATION MODE-LOCKED LASER DEVICE OF THE PRESENT INVENTION

FIG.3
EMBODIMENT 1 OF THE FREQUENCY-MIXED SIGNAL GENERATION MEANS 11

FIG.4
RELATIONSHIP BETWEEN PULSE WIDTH $\Delta t$ AND REPETITION FREQUENCY $F_{rep}$ IN THE PRESENT INVENTION FIG.5 OPERATIONAL THEORY OF THE MULTIPLE-FREQUENCY-MODULATION MODE-LOCKED LASER DEVICE OF THE PRESENT INVENTION

FIG.6A
EMBODIMENT 2 OF THE FREQUENCY-MIXED SIGNAL GENERATION MEANS 11

FIG.6B
OPTICAL MODULATION WAVEFORM

FIG.7
EMBODIMENT 3 OF THE FREQUENCY-MIXED SIGNAL GENERATION MEANS 11

FIG.8
EMBODIMENT 4 OF THE FREQUENCY-MIXED SIGNAL GENERATION MEANS 11

FIG.9
EMBODIMENT 5 OF THE FREQUENCY-MIXED SIGNAL GENERATION MEANS 11

FIG.10
EMBODIMENT 6 OF THE FREQUENCY-MIXED SIGNAL GENERATION MEANS 11

FIG.11
EXAMPLE OF THE COMPOSITION OF A
MODE-LOCKED LASER DEVICE OF THE PRIOR ART

FIG.13
RELATIONSIP BETWEEN PULSE WIDTH Δt AND
REPETITION FREQUENCY Frep IN THE PRIOR ART DEVICE

FIG.14A
PRIOR ART

FIG. 14B
PRESENT INVENTION

MULTIPLE-FREQUENCY-MODULATION TYPE MODE-LOCKED LASER DEVICE

BACKGROUND OF THE INVENTION

1. Technical Field of Application

The present invention relates to multiple-frequency modulation type mode-locked laser devices which generate high-speed optical pulses, for use as high-speed optical pulse sources in the fields of optical communications, optical measurement, or the like.

2. Related Art

Mode-locked laser devices are able to generate ultrashort optical pulses (on the order of femtoseconds) and transform-limited (TL) optical pulses (optical pulses which minimize the time-bandwidth product) which are suited to long-distance optical transmissions. In order to take advantage of these features, research has progressed with an eye towards applications in the fields of high-capacity long-distance optical communications or high-speed optical measurement (see S. Kawanishi et al., "100 Gbit/s, 200 KM OPTICAL TRANSMISSION EXPERIMENT USING EXTREMELY LOW JITTER PLC TIMING EXTRACTION AND ALL-OPTICAL DEMULTIPLEXING BASED ON POLARIZATION INSENSITIVE FOUR-WAVE MIXING", *Electron. Lett.*, Vol. 30, No. 10, 1994, pp. 800–801).

Figure 11:
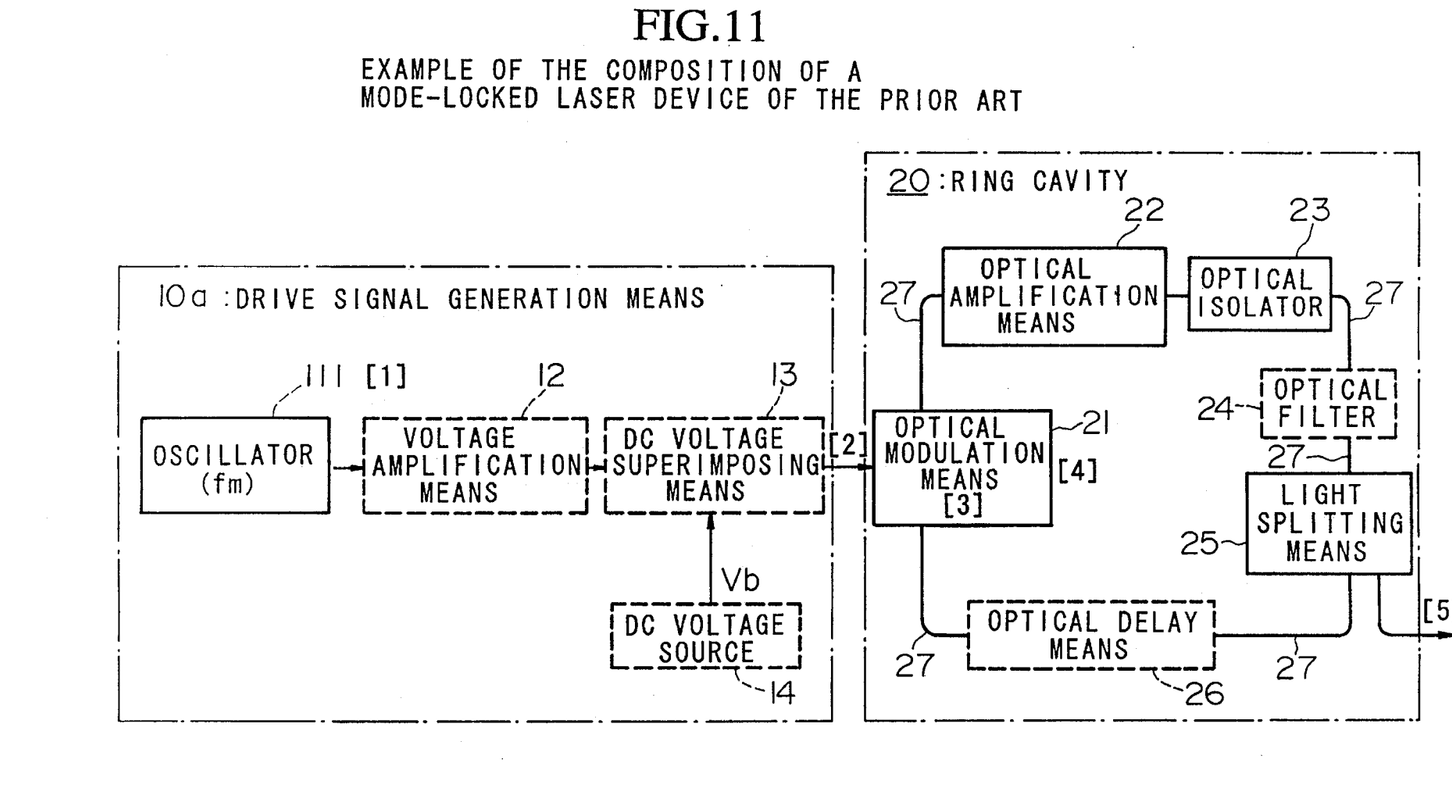
FIG. 11 is a block diagram showing an example of the composition of a mode-locked laser device of the prior art.

FIG. 11 shows an example of the composition of a mode-locked laser device of the prior art (see R. P. Davey et at., "HIGH-SPEED MODE-LOCKED, TUNABLE, INTEGRATED ERBIUM FIBRE LASER", *Electron, Lett.*, 1992, 28, pp. 482–484).

According to this diagram, the mode-locked laser device is composed of a drive signal generation means 10a and a ring cavity 20. The drive signal generation means 10a amplifies an oscillator output [1] from an oscillator 111 which oscillates at a set frequency $f_m$ with a voltage amplification means 12, superimposes a DC voltage $V_b$ provided by a DC voltage source 14 with a DC voltage superimposing means 13, and outputs the resulting drive signal [2]. The ring cavity 20 is composed of an optical modulation means 21, an optical amplification means 22 which amplifies the modulated optical pulse, an optical isolator 23 which fixes the direction of propagation of the optical pulse and isolates the light which has been reflected back, an optical filter 24 which determines the oscillation wavelength within the width of the gain spectrum of the optical amplification means 22, a light splitting means 25 which guides the amplified optical pulse (mode-locked laser output beam [5]) to the outside, an optical delay means 26 which adjusts the cavity length, and the optical coupling means 27, 27, 27, ... which optically couples each of the means in a ring shape. The optical modulation means 21 modulates either the loss or phase of the light based on the frequency $f_m$ of the drive signal [2] received from the drive signal generation means 10a.

As optical modulation means 21, in principle, a modulator utilizing the electro-optical effects of $LiNbO_3$ or the like, a semiconductor laser amplifier, an electroabsorption optical modulator, or others may be used.

As optical amplification means 22, in principle, rare earth-doped fiber amplifiers doped with rare earth elements such as Er or Nd, or semiconductor laser amplifiers may be used. For the rare earth-doped fiber amplifiers, regarding the manner of injection of the pumped light, them are forward pumping, backward pumping, and bi-directional pumping.

As optical coupling means 27, optical fiber, channel-form optical waveguides formed on flat substrates (see Y. Hibino et al., "SILICA-BASED OPTICAL WAVEGUIDE RING LASER INTEGRATED WITH SEMICONDUCTOR LASER AMPLIFIER ON Si SUBSTRATE", *Electron. Lett.*, 1992, 28, pp. 1932–1933), or others may be used.

Below, the theory behind mode-locked laser devices of the prior art will be explained with reference to FIGS. 11 and 12. In these diagrams, [1] is an oscillator output, [2] is a drive signal, [3] is a optical modulator characteristic, [4] is an optical modulation waveform, [5] is a mode-locked laser output waveform, and [6] is a spectrum.

When a Mach-Zehnder optical intensity modulator is used as the optical modulation means 21, in general, the transmission intensity characteristics of the optical modulator can be described as follows:

$$I = I_0 \cos^2\left[\frac{\pi}{2} \cdot \frac{V - V_b}{V_0} - \frac{\pi}{4}\right] \quad (1)$$

Here, $V_0$ is the half-wave voltage, V is the drive signal voltage, and $V_b$ is a constant.

The oscillator output [1] of the frequency $f_m$ is amplified by the voltage amplification means 12 so that the peak-to-peak voltage $V_{p-p}$ is below $V_0$ (within the voltage range of the maximum-minimum values of the optical modulator characteristic [3]), and the DC bias voltage $V_b$ is superimposed on it by the DC voltage superimposing means 13, resulting in the drive signal [2]. This drive signal [2] can be described as follows:

$$V = \frac{V_{p-p}}{2} \sin(2\pi f_m t) + V_b \quad (2)$$

If the oscillator output [1] has a sufficiently large amplitude, then the voltage amplification means 12 is unnecessary. Additionally, if the DC bias voltage $V_b$ of the optical modulator [3] is sufficiently close to zero, then the DC voltage superimposing means 13 and the DC voltage source 14 are unnecessary. By activating the optical modulation means 21 with this drive signal [2], the optical modulation waveform [4] becomes as follows:

$$I = I_0 \cos^2\left[\frac{\pi}{4} \cdot \frac{V_{p-p}}{V_0} \sin(2\pi f_m t) - \frac{\pi}{4}\right] \quad (3)$$

Hereinafter, the frequency $f_m$ of the drive signal [2] which drives the optical modulation means 21 will be referred to as the drive frequency.

The optical path length R of the ting cavity, taking L as the physical length and n as the index of refraction of each element in the ring cavity, can be described as the sum of the products of all of the respective physical lengths $L_i$ and indices of refraction $n_i$ (the respective optical path lengths), as follows:

$$R = \Sigma n_i L_i \quad (4)$$

Figure 12:
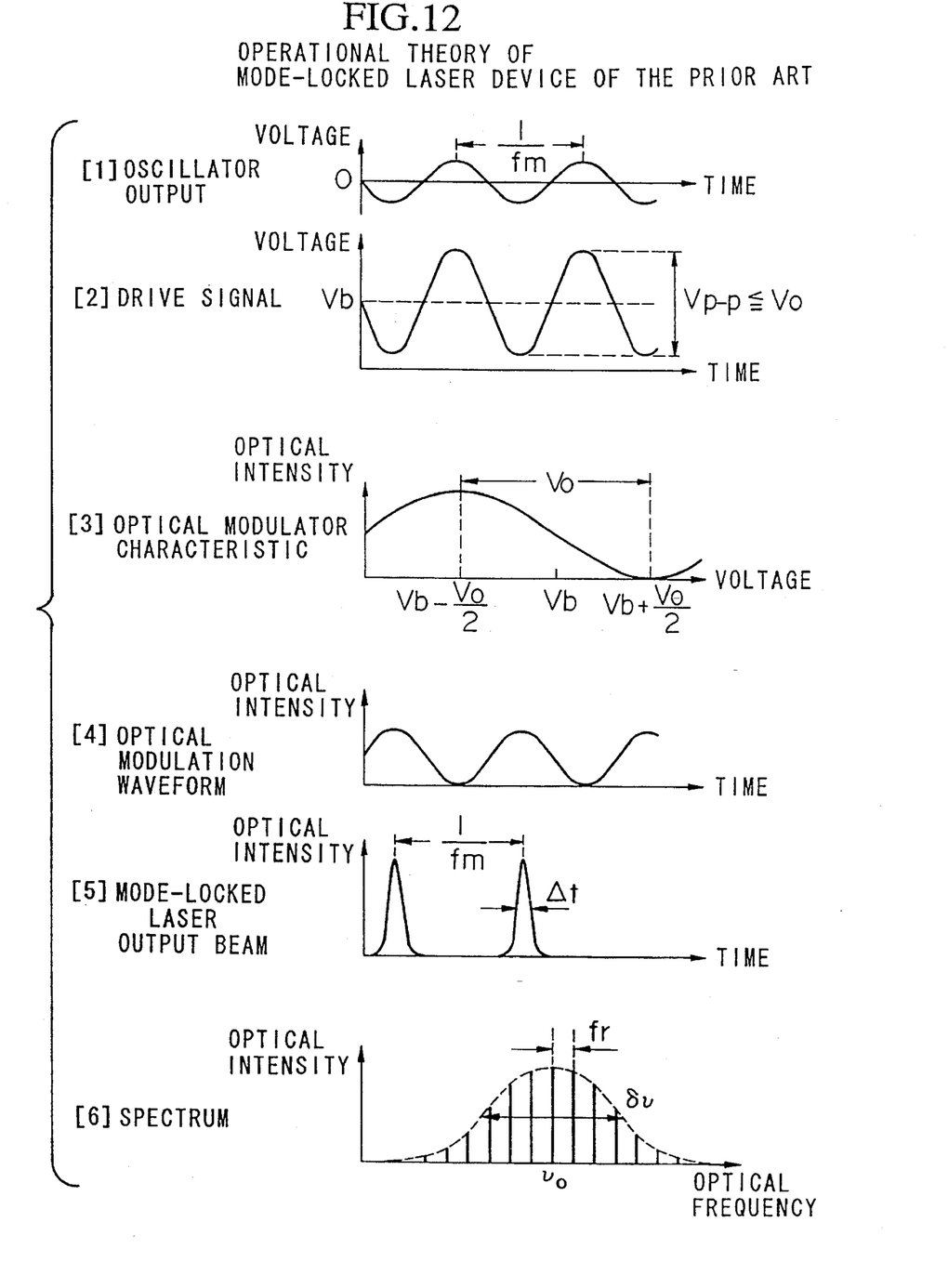
FIG. 12 is a diagram explaining the operating principle of the mode-locked laser device of the prior art.

In this ring cavity, multiple longitudinal modes exist with a frequency spacing of $f_r$ (=c/R wherein c is the speed of light). When the frequency spacing $f_r$ is equal to $f_m$, that is:

$$f_m = f_r = \frac{c}{R} \quad (5)$$

then as shown in FIG. 12, the phases of all of the longitudinal modes at a frequency spacing of $f_r$ match, resulting in a mode-locked oscillation state, and as shown in [5], an optical pulse train of repetition frequency $F_{rep} = f_m$ is obtainable.

On the other hand, if $f_m \neq f_r$, then an optical delay means 26 is provided within the ring cavity as shown in FIG. 11, and thus the optical path length R of the ring cavity is adjusted. The center of this spectral envelope becomes the central wavelength (frequency $v_0$).

Additionally, the optical pulse which minimizes the product of the pulse width $\Delta t$ and the oscillation spectrum width $\delta v$ determined by the envelope of the multiple longitudinal mode spectrum (time-bandwidth product) is called the transform limited (TL) pulse.

Furthermore, if the drive frequency $f_m$ is an integral multiple of the frequency spacing $f_r$, then as a condition of harmonic mode-locking, the following must be true:

$$f_m = N \cdot f_r = N \cdot \frac{c}{R} \tag{6}$$

and an optical pulse train of repetition frequency $F_{rep}=f_m=N \cdot f_r$ is obtainable. In this case, N is a natural number. Therefore, with mode-locked laser devices of the prior art, the repetition frequency $f_{rep}$ and the drive frequency $f_m$ of the output beam are equal.

The pulse width $\Delta t$ of this mode-locked laser output beam [5], according to mode-locking theory, may be described as follows (see A. E. Siegman, "LASERS", University Science Books, p. 1064):

$$\Delta t \cong 0.45 \cdot \left[ \frac{\gamma}{\Delta m} \right]^{1/4} \left[ \frac{1}{f_m \Delta f_a} \right]^{1/2} \tag{7}$$

In this case, $\gamma$ is the gain coefficient of the optical amplification means 22, $\Delta m$ is the peak-to-peak amplitude modulation of the optical modulation means 21, and $\Delta f_a$ is the bandwidth of the optical amplification means 22. From this, it is known that the pulse width $\Delta t$ of the mode-locked laser output beam [5] is proportional to $1/(f_m \Delta f_a)^{1/2}$. Therefore, in order to decrease (or increase) the pulse width $\Delta t$, the drive frequency $f_m$ of the optical modulation means 21 should be made higher (or lower). That is, the gate width of the optical modulation means 21 should be made narrower (or wider).

The gate width of the optical modulation means 21 mentioned here corresponds to the repeated full-width at half-maximum of the optical modulation waveform [4].

Figure 13:
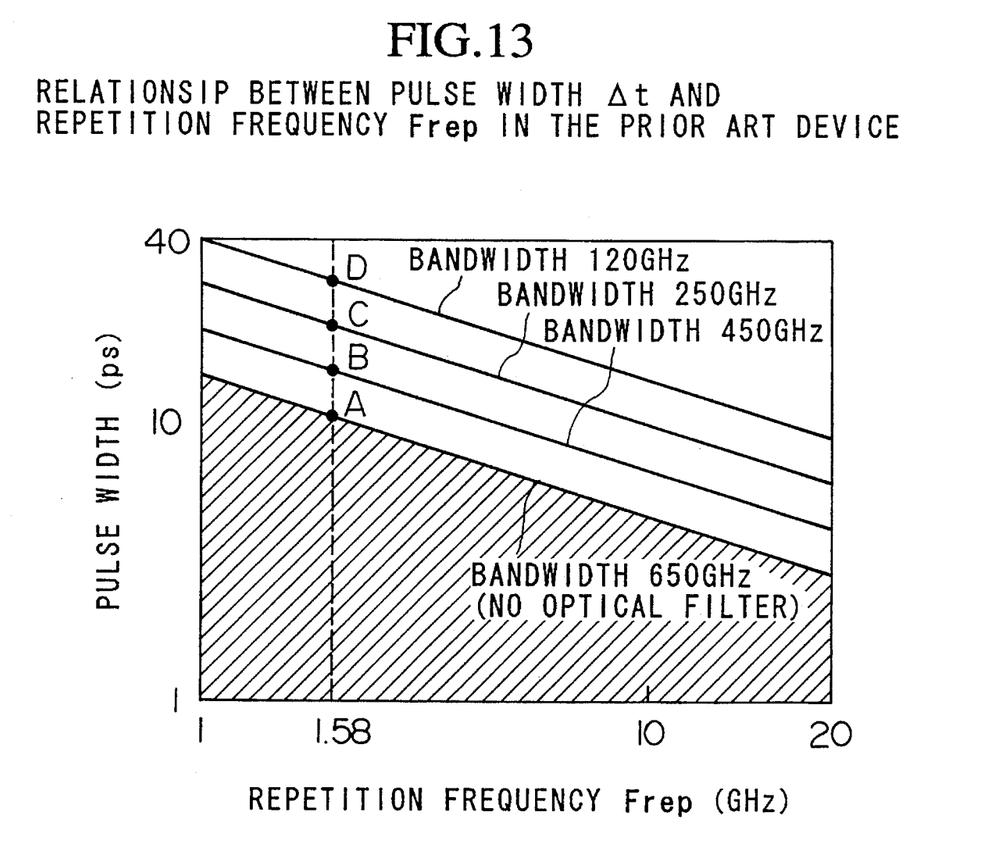
FIG. 13 is a diagram showing the relationship between the pulse width Δt and the repetition frequency $F_{rep}$ of the prior art device.

Therefore, with mode-locked laser devices of the prior art, the pulse width $\Delta t$ depends on the repetition frequency $F_{rep}$ (=drive frequency $f_m$). The relationship between the pulse width $\Delta t$ and the repetition frequency $F_{rep}$ which is determined by Equation (7) is shown in FIG. 13.

Furthermore, since the pulse width $\Delta t$ also depends on the bandwidth $\Delta f_a$ determined by the optical filter 24, the relationship between each bandwidth is also shown.

Generally, for optical soliton transmission, an optical pulse with a specified pulse width is required for a given repetition frequency, for example, taking $\Delta t = 10$ ps for $F_{rep} = 10$ GHz.

Furthermore, for optical measurement techniques such as optical sampling, an ultrashort pulse (on the order of a few ps or less) is required for a low repetition frequency (on the order of tens of KHz) (see Yamabayashi et at., "OPTICAL SAMPLING USING A LiNbO$_3$ WAVEGUIDE AND ULTRASHORT OPTICAL PULSES", *Abstracts of Spring 1988 National Convention of the. Electronic Data Communications Society*, B-671).

In the past, when the repetition frequency $F_{rep}$ was fixed in this way, the pulse width $\Delta t$ was controlled by changing $\Delta f_a$ in Equation (7), principally by adjusting the bandwidth of the optical filter 24 placed within the cavity. As shown by the points A, B, C, and D in FIG. 13, for a set repetition frequency $F_{rep}$ (in this case, 1.58 GHz), by increasing (or decreasing) the bandwidth $\Delta f_a$, it is possible to decrease (or increase) the pulse width $\Delta t$.

The bandwidth $\Delta f_a$ of the optical amplification means 22 is restricted to the atomic linewidth $\Delta f_{atom}$ of the optical amplification medium. Therefore, with the pulse width control method of the prior art which used an optical filter 24, it was not possible to generate an optical pulse shorter than the pulse width (the shaded region in FIG. 13) without a filter ($\Delta f_a = 650$ GHz).

In contrast, there is a method wherein electric signals, having narrow pulse widths and being generated by a pulse generator or the like, are supplied to an optical modulation means 21 where their drive frequencies $f_m$ are made equally high, and thereby the pulse width $\Delta t$ is made smaller for a set bandwidth $\Delta f_a$. However, when generating electric signals with such narrow pulse widths, the jitter at the signal source such as a signal generator becomes large, and as a result, there is the drawback that the jitter in the mode-locked laser output beam becomes large as well.

Furthermore, for a given repetition frequency $F_{rep}$, in order to obtain a TL optical pulse having a pulse width even smaller than the theoretical limit in this case, there is a method wherein adiabatic soliton compression is used on the optical pulse (see K. Suzuki et al., *Tech. Digest OAA '93*, TuD2, p. 314). However, with this method, since an adiabatic soliton compressor is required outside of the laser cavity, its composition is complicated.

Additionally, besides the reference material given above, there are the following papers:

(1) H. Takara et at., "GENERATION OF HIGHLY STABLE 20 GHz TRANSFORM-LIMITED OPTICAL PULES FROM ACTIVELY MODE-LOCKED Er$^{3+}$-DOPED FIBRE LASERS WITH AN ALL-POLARISATION MAINTAINING RING CAVITY", *Electronics Letters*, 22nd Oct. 1992, Vol. 28, No. 22, pp. 2095–2096.

(2) H. Takara et al., "20 GHz TRANSFORM-LIMITED OPTICAL PULSE GENERATION AND BIT-ERROR-FREE OPERATION USING A TUNABLE, ACTIVELY MODE-LOCKED Er-DOPED FIBRE RING LASER", *Electronics Letter*, 24th Jun. 1993, Vol. 29, No. 13, pp. 1149–1150.

(3) Japanese Patent First Publication No. 2-310982, laid open Dec. 26, 1990, "MODE-LOCKED FIBER LASER DEVICE", A. Takada, K. Hagimoto.

(4) Japanese Patent First Publication No. 3-229478, laid open Oct. 11, 1991, "MODE-LOCKED LASER DEVICE", A. Takada, Y. Yamabayashi.

(5) Japanese Patent First Publication No. 5-75194, laid open Mar. 26, 1993, "WAVELENGTH MULTIPLEXED MODE-LOCKED LASER DEVICE", M. Saruwatari, S. Kawanishi, H. Takara.

(6) Japanese Patent First Publication No. 6-85366, laid open Mar. 25, 1994, "HARMONIC MODE-LOCKED LASER DEVICE", G. T. Harvey, L. F. Mollneur.

SUMMARY OF THE INVENTION

The present invention has as its objective the presentation of a multiple-frequency-modulation type mode-locked laser device which focuses on these problems of the prior art, and is able to independently change the repetition frequency $F_{rep}$ and the pulse width $\Delta t$ with only the mode-locked laser device.

The present invention, being provided with a drive signal generation means for generating a frequency-mixed drive signal mixed from two or more different frequencies $f_1(=N_1 f_r)$, $f_2(=N_2 f_r)$, . . . , which are integral multiples of the frequency spacing $f_r$ of the longitudinal modes of either a ring cavity or a Fabry-Perot cavity, offers a device which supplies this frequency-mixed drive signal to an optical modulation means of the cavity.

With the multiple-frequency-modulation type mode-locked laser device of the present invention, by driving the optical modulation means with a frequency-mixed drive signal mixed from multiple frequencies, a narrow gate width is formed by the high-frequency components, and a corresponding short optical pulse of pulse width Δt is obtainable. Also, because the light propagating within the cavity repeatedly receives this modulation, the repetition frequency $F_{rep}$ becomes the repetition frequency of the envelope of the frequency-mixed drive signal (the greatest common divisor of the drive frequencies).

That is, by driving the optical modulation means with a frequency-mixed drive signal, it is possible to independently control the pulse width Δt and the repetition frequency $F_{rep}$. Additionally, only the generation of a frequency-mixed drive signal is required, so it is possible to apply using only the device itself.

Therefore, with the multiple-frequency-modulation type mode-locked laser device of the present invention, by driving the optical modulation means with a frequency-mixed drive signal mixed from multiple frequencies, it is possible to independently control the pulse width Δt and the repetition frequency $F_{rep}$. Accordingly, for some fixed repetition frequency $F_{rep}$, it is possible to generate a TL optical pulse with a narrower pulse width Δt than the prior art.

Furthermore, the composition to generate a frequency-mixed drive signal may be realized with only the device itself. In addition, if an oscillator with low jitter characteristics is used, the generation of an optical pulse train with extremely low jitter in comparison to that of the prior art method wherein the optical modulator is driven with a pulse generator or the like is possible.

EMBODIMENTS OF THE INVENTION

Below, the embodiments of the present invention will be explained with reference to the drawings.

Figure 1:
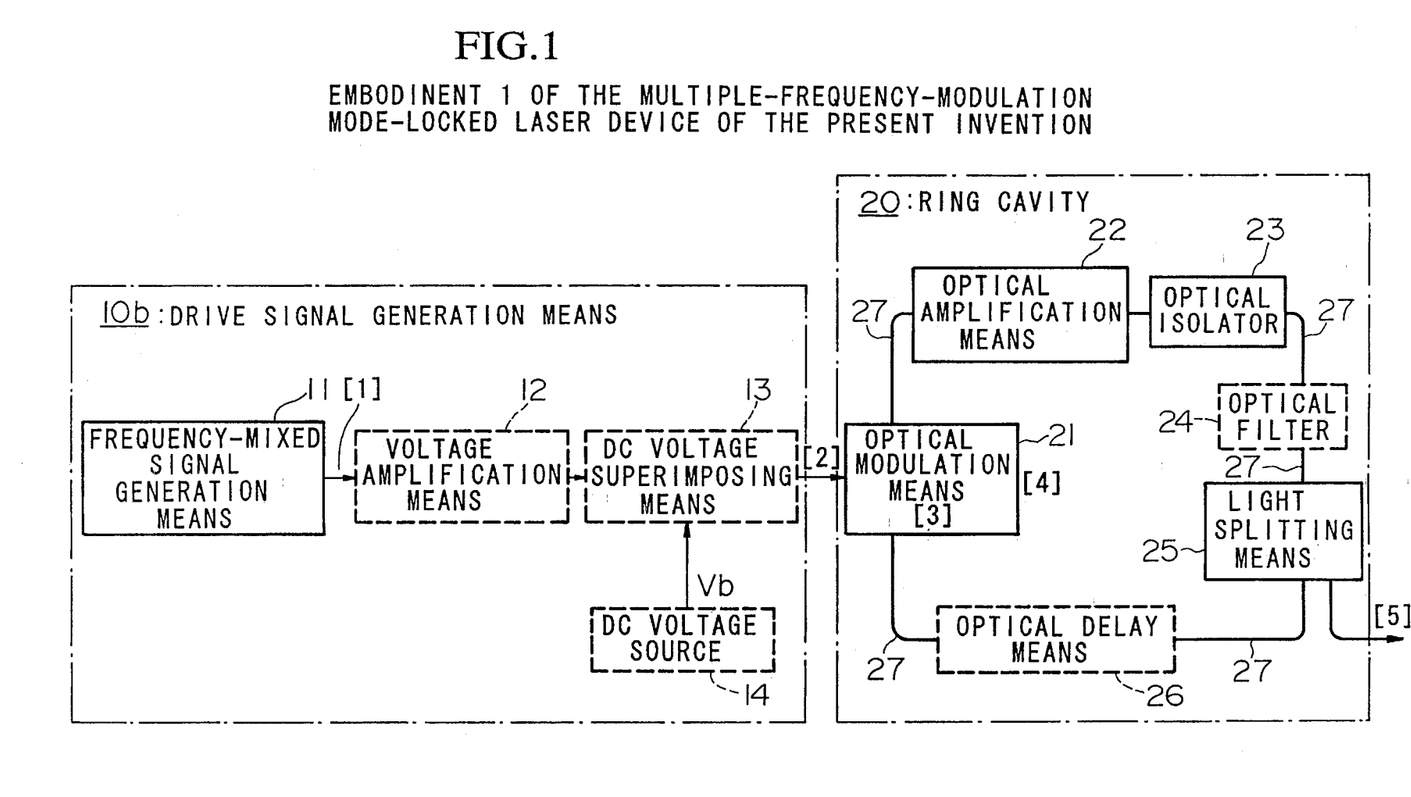
FIG. 1 is a block diagram showing the composition of Embodiment 1 of the present invention.

FIG. 1 shows the composition of Embodiment 1 of the multiple-frequency-modulation type mode-locked laser device of the present invention.

In this diagram, the multiple-frequency-modulation type mode-locked laser device of the present invention is composed of a drive signal generation means 10b and a ring cavity 20. The drive signal generation means 10b, in contrast to the oscillator 111 of the prior art drive signal generation means 10a shown in FIG. 11, has a frequency-mixed signal generation means 11 which outputs a frequency-mixed signal [1]. The voltage amplification means 12, the DC voltage superimposing means 13 and the DC voltage source are identical to those in FIG. 11. The ring cavity 20 is similarly composed of an optical modulation means 21, an optical amplification means 22, an optical isolator 23, an optical filter 24, a light splitting means 25, an optical delay means 26 and an optical coupling means 27.

Figure 2:
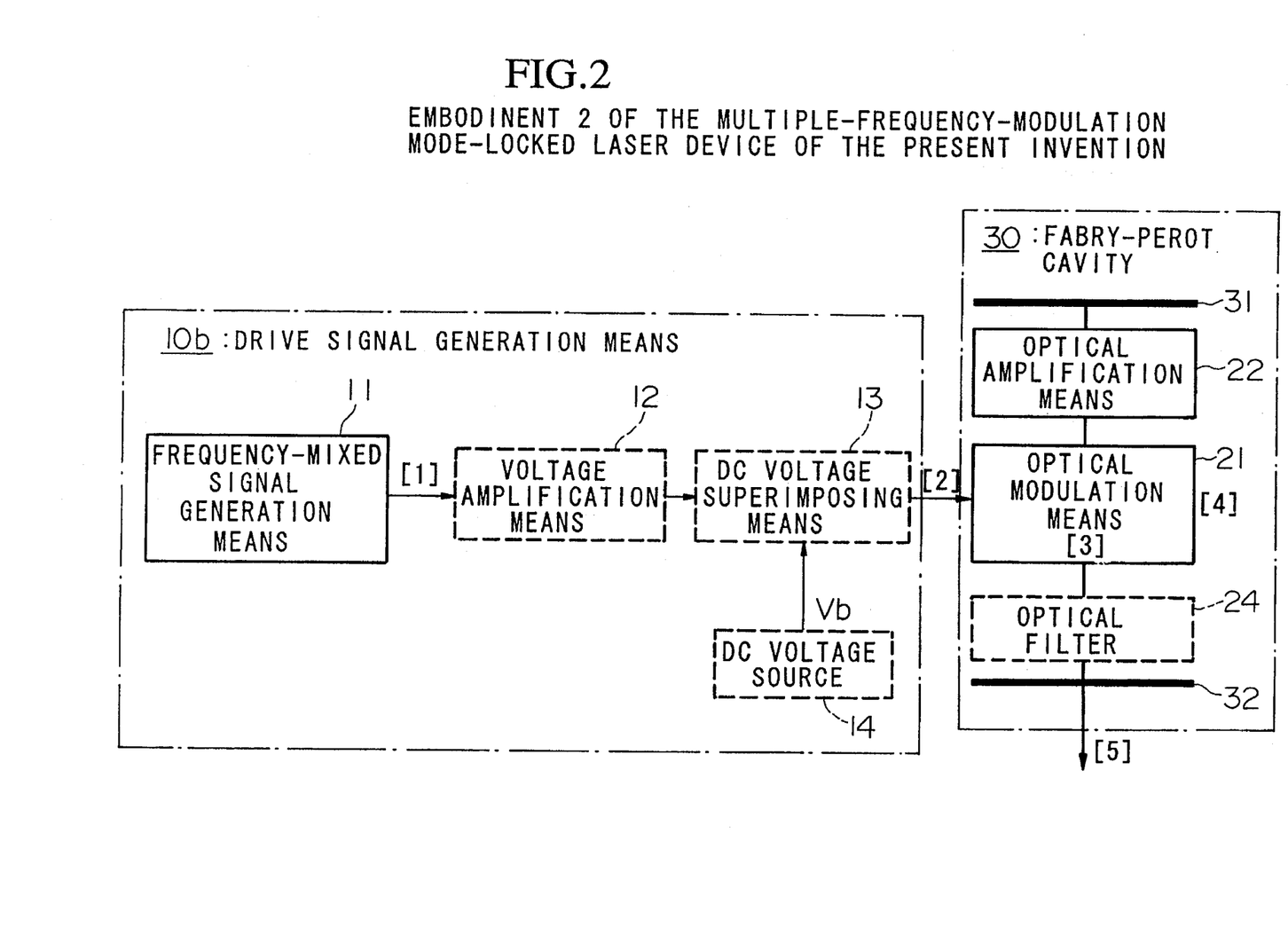
FIG. 2 is a block diagram showing the composition of Embodiment 2 of the present invention.

FIG. 2 shows the composition of Embodiment 2 of the multiple-frequency-modulation type mode-locked laser device of the present invention.

In this diagram, the multiple-frequency-modulation type mode-locked laser device of the present invention is composed of a drive signal generation means 10b and a Fabry-Perot cavity 30. The drive signal generation means 10b is identical in composition to that of Embodiment 1. The Fabry-Perot cavity 30 is composed of an optical modulation means 21, an optical amplification means 22 and an optical filter 24 placed between two optical mirrors 31 and 32. Aside from the fact that the resonator composition is of the Fabry-Perot type, the present embodiment has the same composition as Embodiment 1 which uses a ring cavity.

Figure 3:
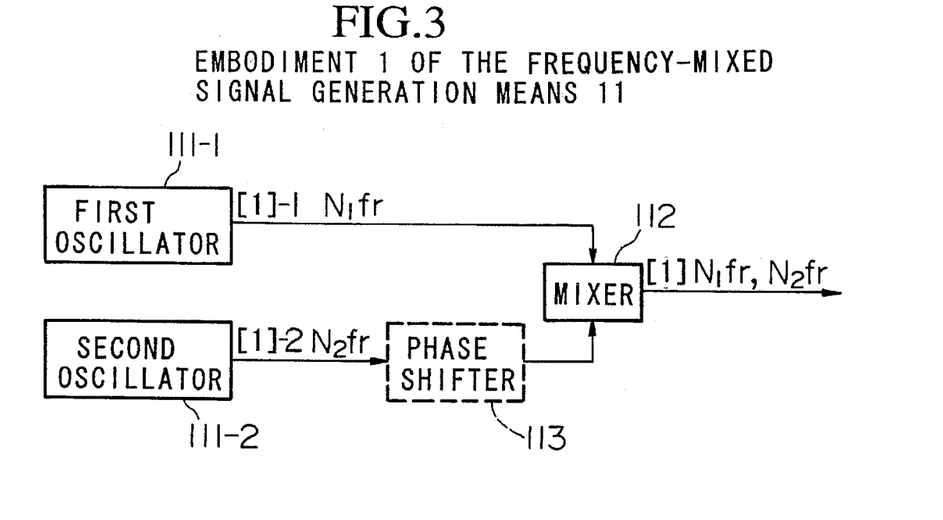
FIG. 3 is a block diagram showing the composition of Embodiment 1 of the frequency-mixed signal generation means 11 shown in FIGS. 1 and 2.

FIG. 3 shows the composition of Embodiment 1 of the frequency-mixed signal generation means 11 used in the present device. In the diagram, 111-1 and 111-2 are first and second oscillators, and 112 is a mixer. Additionally, between the second oscillator 111-2 and the mixer 112, a phase shifter 113 is inserted as needed.

Below, the operating principle of the present embodiment will be explained with reference to FIGS. 1–3 and 5.

The first oscillator 111-1 and the second oscillator 111-2 each oscillate at different frequencies $f_{m1}$ and $f_{m2}$ ([1]-1 and [1]-2). In this case, the frequencies $f_{m1}$ and $f_{m2}$ are set equal to integral multiples of the frequency spacing $f_r$ between the longitudinal modes of the cavity, by adjusting the frequencies of each oscillator, or in a ring cavity 20, by adjusting the optical path length R using an optical delay means 26, or in a Fabry-Perot cavity 30, by moving the optical mirrors 31 and 32. That is, the following is set:

$$f_{m1} = N_1 f_r = N_1 \frac{c}{R} \quad (8)$$

$$f_{m2} = N_2 f_r = N_2 \frac{c}{R} \quad (9)$$

In this case, $N_1$ and $N_2$ are natural numbers, wherein $N_1 < N_2$.

When both oscillators are stably oscillating, the oscillation signals between the oscillators are in synchronization, and the time phase differences in the oscillator outputs [1]-1 and [1]-2 are constant. The mixer 112 then mixes the oscillator outputs and generates a frequency-mixed signal [1]. In this case, if multiple maxima of the frequency-mixed signal [1] are formed within the repeated cycle of the envelope, by inserting a phase shifter 113 and adjusting the phase difference $\Theta$ between the oscillator outputs [1]-1 and [1]-2, it is possible to merge the maxima into a single peak.

The frequency-mixed signal [1] having frequencies $N_1 f_r$ and $N_2 f_r$ is amplified by the voltage amplification means 12 so that the peak-to-peak voltage $V_{p-p}$ becomes less than or equal to $V_0$ (within the voltage range of the minimum and maximum values of the optical modulator characteristic [3]), and after the DC bias voltage $V_b$ is superimposed by the DC voltage superimposing means 13, becomes the frequency-mixed drive signal [2]. This frequency-mixed drive signal [2] can be described as follows:

$$V = V_1 \sin(2\pi N_1 f_r t) + V_2 \sin(2\pi N_2 f_r t + \Theta) + V_b \ldots \quad (10)$$

In this case, $V_1$ and $V_2$ are the amplitudes of the components of frequencies $N_1 f_r$ and $N_2 f_r$ respectively.

If the frequency-mixed signal [1] has a sufficiently large amplitude, then it is possible to omit the voltage amplification means 12.

Furthermore, if $V_b$ is sufficiently close to zero for the optical modulator characteristic, then it is possible to omit the DC voltage superimposing means 13 and the DC voltage source 14.

By driving the optical modulation means 21 with this frequency-mixed drive signal [2], the optical modulation waveform [4] becomes as follows:

$$I = I_0 \cos^2\left[ \frac{\pi}{4V_0} \{V_1 \sin(2\pi N_1 f_r t) + V_2 \sin(2\pi N_2 f_r t + \theta)\} - \frac{\pi}{4} \right] \quad (11)$$

The optical modulation waveform [4] is a waveform wherein the waveform of the drive frequency $N_2 f_r$ is intensity modulated by the drive frequency $N_1 f_r$. Therefore, a narrow gate width is formed by the high frequency component $N_2 f_r$, and a short optical pulse with a pulse width $\Delta t$ corresponding to the drive frequency $f_m = N_2 f_r$ of Equation (7) is obtainable. The light propagating within the cavity is repeatedly modulated in this way, and the optical pulses of the maxima in the optical modulation waveform [4] (points A and A' in FIG. 5) are selectively reinforced, so the repetition frequency $F_{rep}$ approaches the repetition frequency of the envelope of the frequency-mixed drive signal [2]. This repetition frequency of the envelope is the largest common denominator of the drive frequency $N_1 f_r$ and the drive frequency $N_2 f_r$.

The present invention, by applying a frequency-mixed drive signal [2] to the optical modulation means 21 in this way, it is possible to independently control the pulse width $\Delta t$ and the repetition frequency $F_{rep}$. For example, if $f_{m1} = 2f_r$ and $f_{m2} = 8f_r$, an optical pulse having a pulse width $\Delta t$ corresponding to a drive frequency $8f_r$ is obtained, and the repetition frequency $F_{rep}$ becomes $2f_r$.

Additionally, if $f_{m1} = 3f_r$ and $f_{m2} = 7f_r$, an optical pulse having a pulse width $\Delta t$ corresponding to a drive frequency $7f_r$ is obtained, and the repetition frequency $F_{rep}$ becomes $f_r$.

Figure 4:
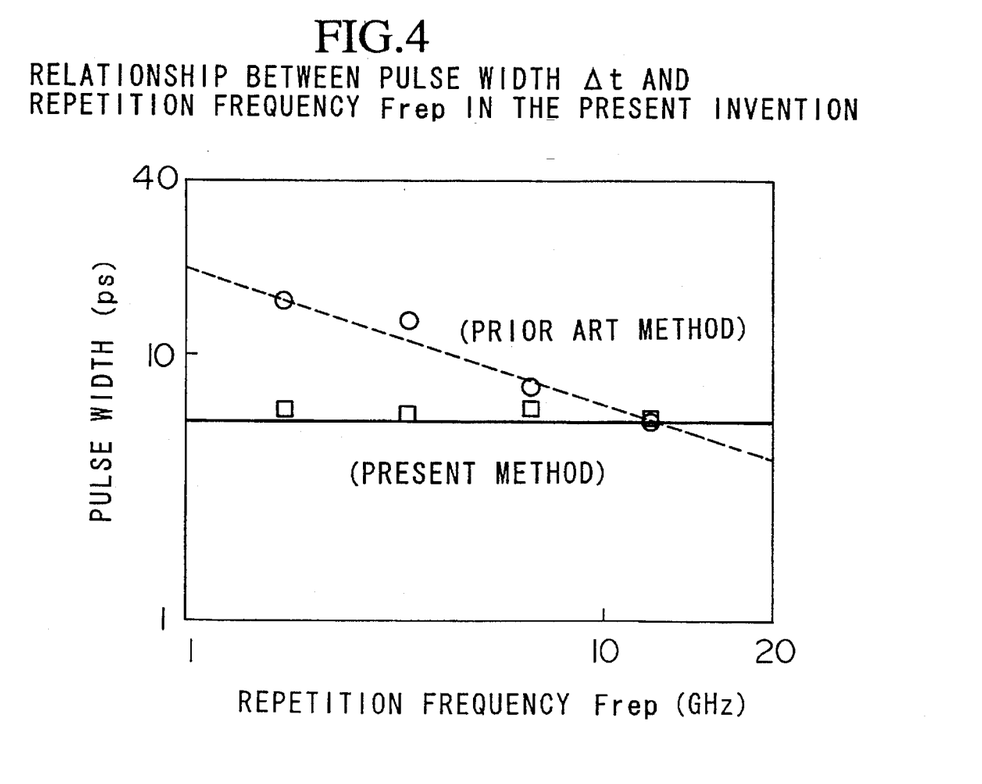
FIG. 4 is a diagram showing the relationship between the pulse width Δt and the repetition frequency $F_{rep}$ of the present invention.
Figure 5:
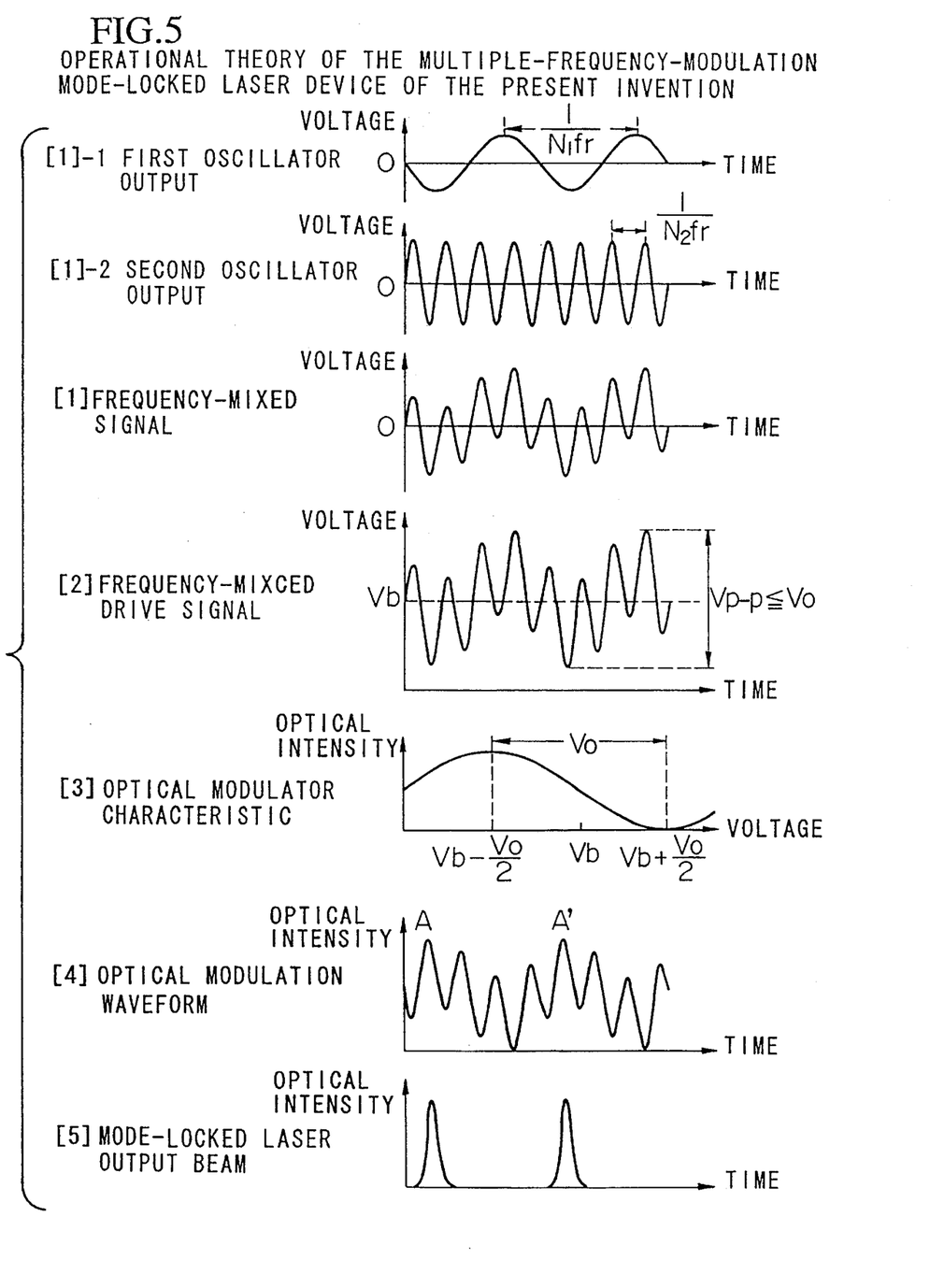
FIG. 5 is a diagram explaining the operating principle of the device of the present invention.

FIG. 4 shows the relationship between the pulse width $\Delta t$ and the repetition frequency $F_{rep}$ when using the frequency-mixed signal generation means 11 of Embodiment 1.

In this case, the oscillation frequency $N_1 f_r$ of the first oscillator 111-1 is varied (1–12.6 GHz) while the oscillation frequency $N_2 f_r$ of the second oscillator 111-2 is held constant (12.6 GHz). The solid line represents the theoretical values for the method of the present invention according to Equation (7), wherein $f_m = 12.6$ GHz in Equation (7). The dotted line represents the theoretical values for the prior art method according to Equation (7), wherein $f_m = F_{rep}$ in Equation (7). The plots are measured values obtained by experiments. As can be seen, the measured values substantially agree with the theoretical values. With the mode-locked laser device of the prior art, changes in the repetition frequency $F_{rep}$ also cause the pulse width $\Delta t$ to change. In contrast, with the present invention, even if the repetition frequency $F_{rep}$ is changed by the oscillation frequency $N_1 f_r$ of the first oscillator 111-1, the pulse width $\Delta t$ stays fixed at a low value determined by the oscillation frequency $N_2 f_r$ of the second oscillator 111-2.

Figure 14A:
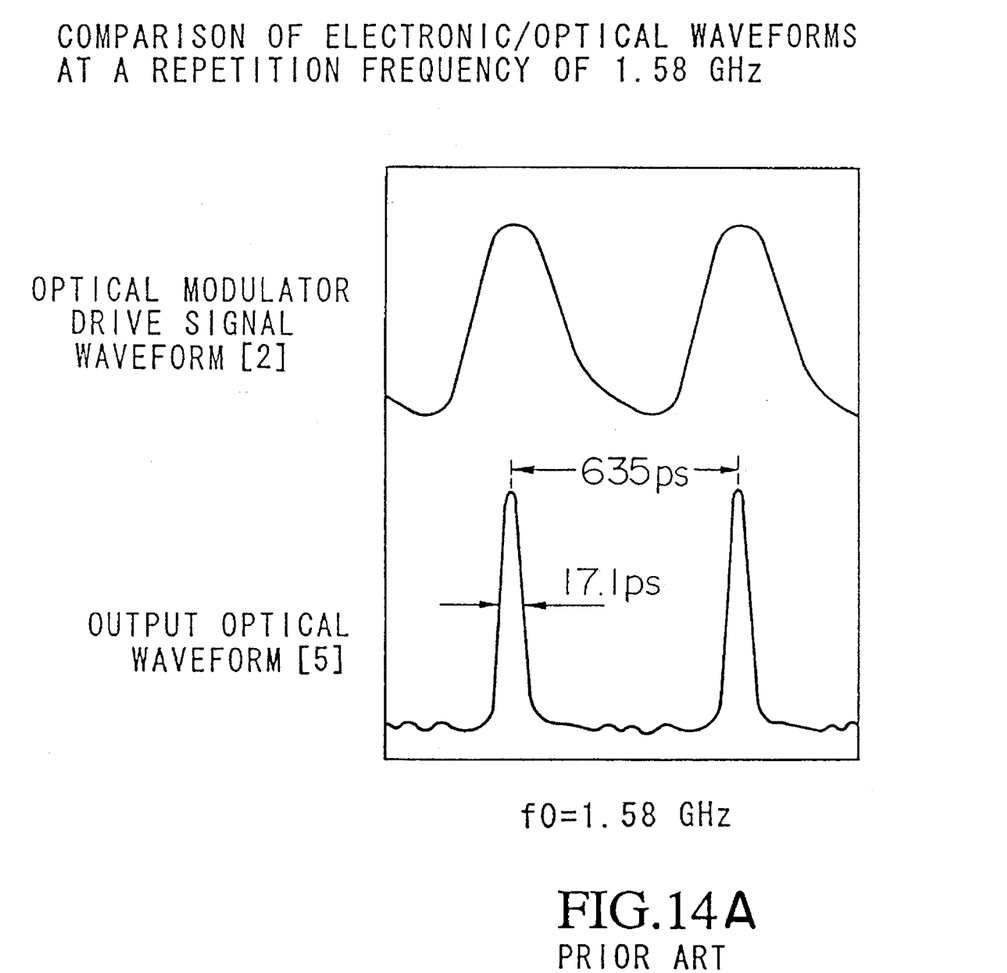
FIG. 14 is a drawing comparing the electronic/optical waveforms of the prior art device and the device of the present invention with an optical pulse repetition frequency of 1.58 GHz.
Figure 14B:
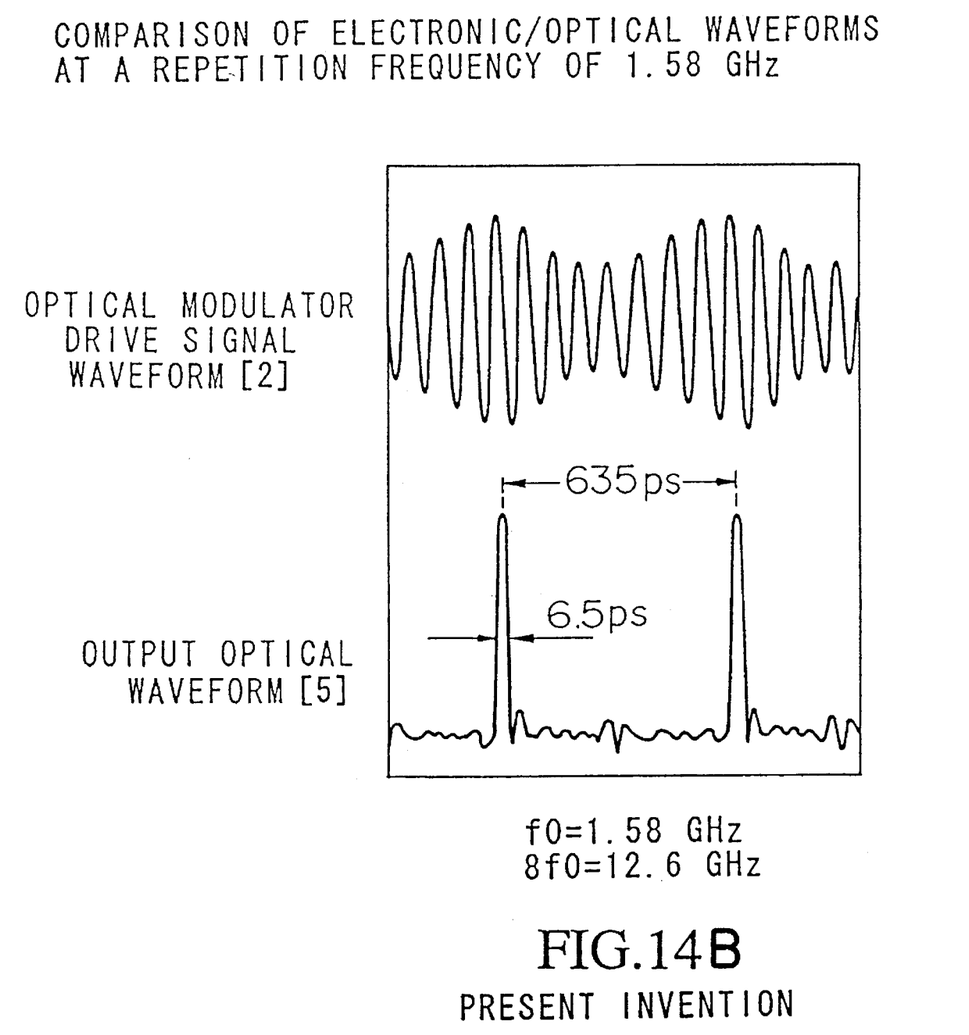

Additionally, FIG. 14 shows an example of a plot waveform.

Furthermore, the time-bandwidth product of the output beam according to the present invention was measured at 0.31–0.35, and it was confirmed that a TL optical pulse having an approximate $\text{sech}^2$ shape was being generated. In this way, since the device of the present invention is able to independently control the pulse width $\Delta t$ and the repetition frequency $F_{rep}$, even with the same repetition frequency $F_{rep}$, it is possible to generate a TL optical pulse having a pulse width $\Delta t$ shorter than those of the prior art with only the laser itself.

Furthermore, with the composition of the device of the present invention, the composing elements of the frequency-mixed signal generation means 11 other than the oscillator do not contribute to jitter.

Furthermore, for the oscillator of the frequency-mixed signal generation means 11, it is possible to use an oscillator which produces normal waveforms such as sine waves, so it is possible to easily practicalize an oscillator in which the jitter is small. Thus, by using this type of oscillator having low jitter characteristics, it is possible to generate an optical pulse train with low jitter in comparison with the prior art method wherein the optical modulator is driven by a pulse generator or the like.

Additionally, although the above explanation was for the mixing of two frequencies, it is also possible to mix three or more frequencies.

Figures 6A, 6B:
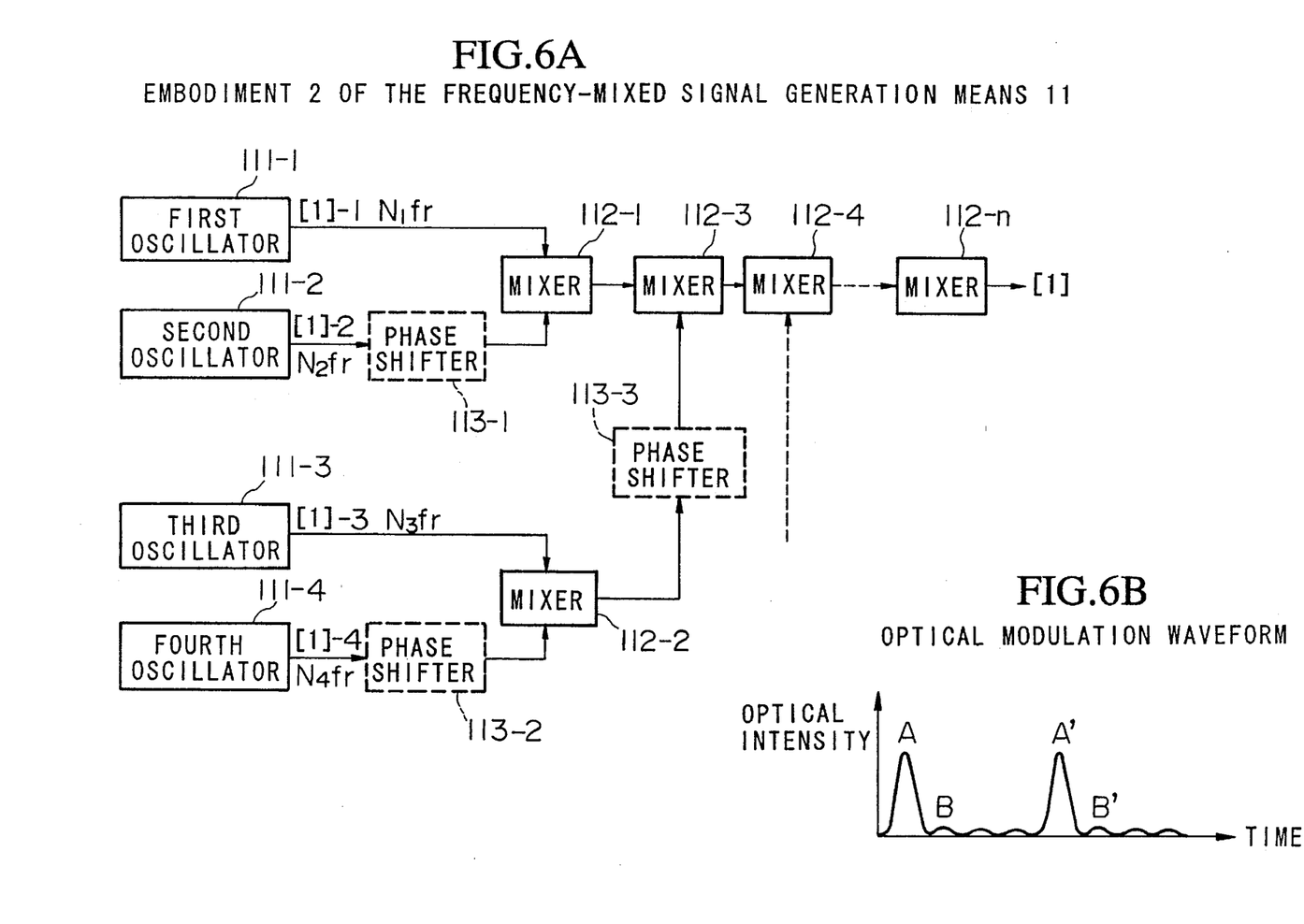
FIG. 6A is a block diagram showing the composition of Embodiment 2 of the frequency-mixed signal generation means 11 shown in FIGS. 1 and 2.
FIG. 6B is a diagram showing the time variation in the optical intensity of the optical modulation waveform in the case in which the frequency-mixed signal generation means 11 shown in FIG. 6A is used.

FIG. 6A shows the composition of Embodiment 2 of the frequency-mixed signal generation means 11, for the case in which four or more frequency components are mixed. In this diagram, 111-1 through 111-4 are the first through fourth oscillators, wherein each oscillator is stably oscillating, and the oscillators are in synchronization. 112-1 through 112-n are mixers.

The phase shifters 113-1 through 113-3 for adjusting the phase of the oscillator outputs are inserted as is necessary.

With this type of composition, as the number of frequency components increases, the optical modulation waveform approaches the form of a delta function, as shown in FIG. 6B. Therefore, the suppressing effect of the undesirable maxima (for example, B and B') which are not at points A or A' increases, and the stability improves. The repetition frequency $F_{rep}$ in this case becomes the largest common denominator of all of the frequency components, and the pulse width $\Delta t$ becomes equal to the value obtained by substituting $f_m$ in Equation (7) with the highest frequency component.

Figure 7:
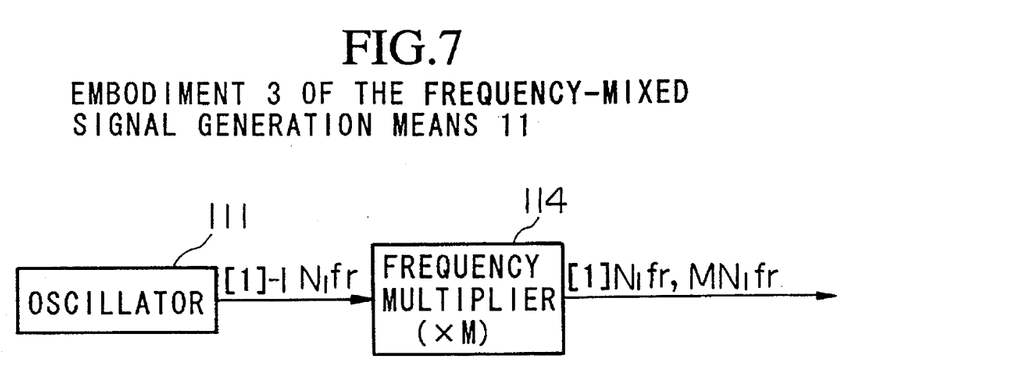
FIG. 7 is a block diagram showing the composition of Embodiment 3 of the frequency-mixed signal generation means 11 shown in FIGS. 1 and 2.

FIG. 7 shows Embodiment 3 of the frequency-mixed signal generation means 11 used in the device according to the present invention. In this diagram, the frequency-mixed signal generation means 11 is composed of an oscillator 111 which oscillates at frequency $f_m$ (=$N_1f_r$), and a frequency multiplier 114 which multiplies the oscillator output [1]-1 by M (M is an integer≧2). The frequency multiplier 114 outputs not only the multiplied frequency component $MN_1f_r$, but also the original frequency component $N_1f_r$. Therefore, it is able to output a frequency-mixed signal [1] mixing two frequencies.

Figure 8:
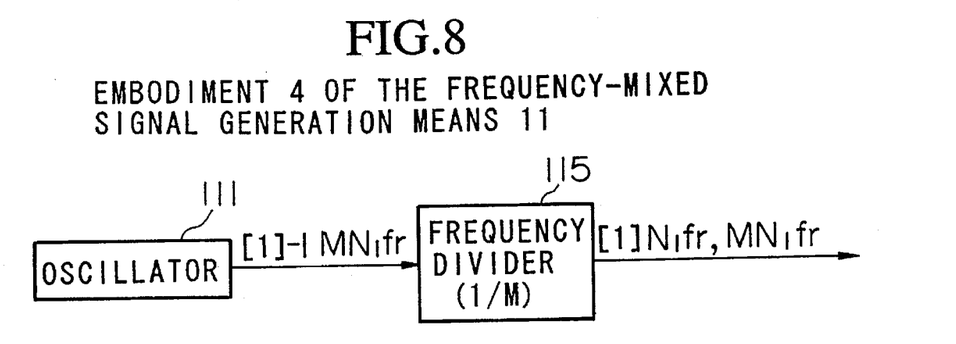
FIG. 8 is a block diagram showing the composition of Embodiment 4 of the frequency-mixed signal generation means 11 shown in FIGS. 1 and 2.

FIG. 8 shows the composition of Embodiment 4 of the frequency-mixed signal generation means 11 used in the device according to the present invention. In this diagram, the frequency-mixed signal generation means 11 is composed of an oscillator 111 which oscillates at the frequency $f_m$ (=$MN_1f_r$), and a frequency divider 115 which divides the oscillator output [1]-1 by M (M is an integer≧2). The frequency divider 115 outputs not only the divided frequency component $N_1f_r$, but also the original frequency component $MN_1f_r$. Therefore, it is able to output a frequency-mixed signal [1] mixing two frequencies.

When the frequency-mixed signal generation means 11 is composed using a frequency multiplier or a frequency divider in this way, the composition becomes simple, and it is easy to miniaturize the device.

With the frequency-mixed signal generation means 11 using a frequency multiplier 114 or a frequency divider 115, it is difficult to have a composition in which it is possible to adjust the phase difference between both frequency components included in the frequency-mixed signal [1]. Thus, with the compositions shown in FIGS. 7 and 8, it is desirable to pre-set the phase characteristics of the frequency multiplier 114 or the frequency divider 115 such that the maximum points of the frequency-mixed signal [1] unite within the repetition cycle of the envelope.

Figure 9:
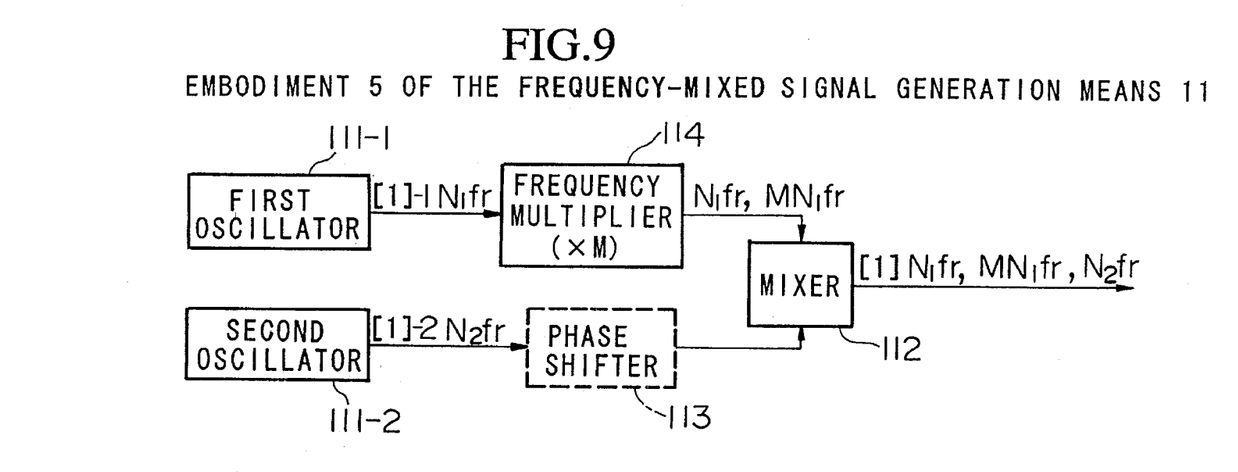
FIG. 9 is a block diagram showing the composition of Embodiment 5 of the frequency-mixed signal generation means 11 shown in FIGS. 1 and 2.

FIG. 9 shows the composition of Embodiment 5 of the frequency-mixed signal generation means 11 used in the device according to the present invention. The present embodiment corresponds to a composition in which the mixer 112 of Embodiment 1 and the frequency multiplier 114 of Embodiment 3 are combined. That is, the first oscillator 111-1 and the second oscillator 111-2 oscillate at the different frequencies $N_1f_r$ and $N_2f_r$, the frequency multiplier 114 multiplies the oscillator output [1]-1 of the first oscillator 111-1 by M, and the mixer 112 outputs a frequency-mixed signal [1] having the three components $N_1f_r$, $MN_1f_r$, and $N_2f_r$. In this case, $N_2$ is greater than or equal to 2, and is an integer other than $N_1$ or $MN_1$. Additionally, a phase shifter 113 can be added as is necessary.

Figure 10:
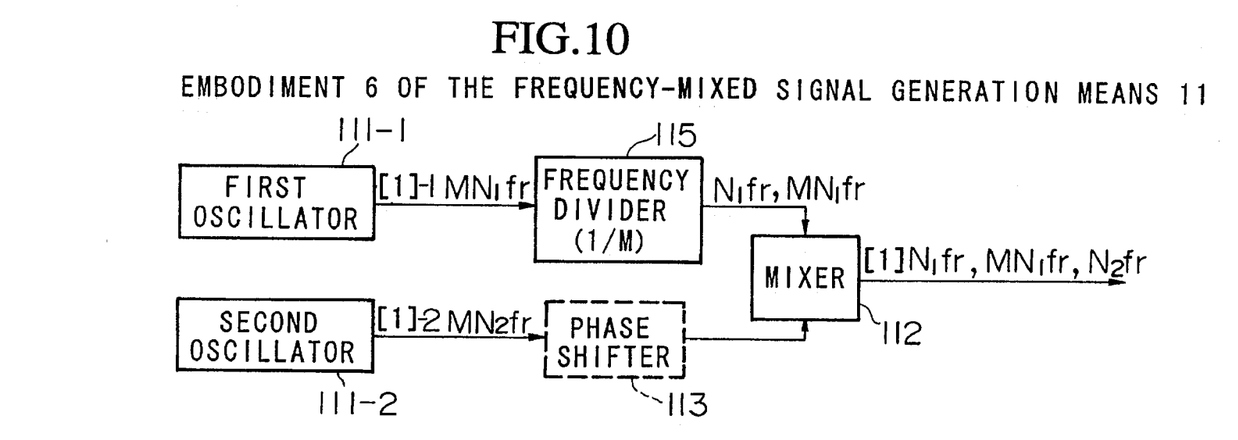
FIG. 10 is a block diagram showing the composition of Embodiment 6 of the frequency-mixed signal generation means 11 shown in FIGS. 1 and 2.

FIG. 10 shows the composition of Embodiment 6 of the frequency-mixed signal generation means 11 used in the device according to the present invention. The present embodiment corresponds to a composition in which the mixer 112 of Embodiment 1 and the frequency divider 115 of Embodiment 4 are combined. That is, the fast oscillator 111-1 and the second oscillator 111-2 oscillate at the different frequencies $MN_1f_r$ and $N_2f_r$, the frequency divider 115 divides the oscillator output [1]-1 of the fast oscillator 111-1 by M, and the mixer 112 outputs a frequency-mixed signal [1] having the three components $N_1f_r$, $MN_1f_r$, and $N_2f_r$. In this case, $N_2$ is greater than or equal to 2, and is an integer other than $N_1$ or $MN_1$. Additionally, a phase shifter 113 can be added as is necessary.

Additionally, with the compositions of Embodiment 5 and Embodiment 6, the repetition frequency $F_{rep}$ is the largest common denominator of all of the frequency components, and the pulse width Δt becomes equal to the value obtained by substituting $f_m$ in equation (7) with the highest frequency component.

Furthermore, it is also possible to have a composition wherein the mixer 112, the frequency multiplier 114 and the frequency divider 115 are simultaneously combined.

In the above-given explanation of the embodiments of the present invention, as the optical modulation means 21 shown in FIGS. 1 and 2, an example in which a Mach-Zehnder optical intensity modulator is used was discussed in detail, but the optical modulation means 21 used in the mode-locked laser device need not be limited to means which perform this type of optical intensity modulation, and it is also possible to use means which perform optical phase modulation. In such a case, mode synchronization is achieved by optical phase modulation, but the frequency-mixed signal [1] driving the optical modulation means 21 can be identical to that used for the optical intensity modulation means.

We claim:

1. A multiple-frequency-modulation type mode-locked laser device comprising:

an optical cavity, which includes
an optical modulation means for receiving an optical pulse and a driving signal, modulating said optical pulse in response to said driving signal, and outputting a modulated optical pulse;
an optical amplification means for amplifying said modulated optical pulse;
an optical splitting means for outputting a split optical pulse from said optical cavity; and
an optical coupling means for optically coupling said optical modulation means, said optical amplification means, and said optical splitting means to form said optical cavity, in order; and
a driving signal generation means for generating said driving signal as a frequency-mixed driving signal mixed from at least two different frequencies which are integral multiples of a frequency spacing f, of a longitudinal mode of said optical cavity, wherein $f_r$=c/R, c is the velocity of light, and R is an optical path length of said optical cavity.

2. A multiple-frequency-modulation type mode-locked laser device according to claim 1, wherein said optical cavity is a ring cavity type and said optical coupling means optically couples said optical modulation means, said optical amplification means, and said optical splitting means into a ring shape to form a ring cavity.

3. A multiple-frequency-modulation type mode-locked laser device according to claim 2, wherein an optical delay means is provided within said ring cavity for adjusting the optical path length R of the ring cavity.

4. A multiple-frequency-modulation type mode-locked laser device according to claim 1, wherein said optical cavity is a Fabry-Perot cavity type, and said optical cavity, which further includes two optical reflection means which reflect an incident optical pulse, wherein said optical coupling means couples said optical reflection means at ends of a series configuration, and optically couples said optical modulation means and said optical amplification means between said two optical reflection means to form a Fabry-Perot type cavity, and wherein said optical splitting means consists of one of said two reflection means to output a part of an incident pulse from said Fabry-Perot type cavity.

5. A multiple-frequency-modulation type mode-locked laser device according to claim 1, wherein said driving signal generation means includes at least two oscillators which oscillate at mutually different frequencies, and a mixer for generating said frequency-mixed driving signal by mixing outputs of said oscillators.

6. A multiple-frequency-modulation type mode-locked laser device according to claim 1, wherein said driving signal generation means includes an oscillator which oscillates at a fixed frequency, and a frequency multiplier for multiplying the frequency of an output of said oscillator by an integer greater than or equal to 2.

7. A multiple-frequency-modulation type mode-locked laser device according to claim 1, wherein said driving signal generation means includes an oscillator which oscillates at a fixed frequency, and a frequency divider for dividing the frequency of an output of said oscillator by an integer greater than or equal to 2.

8. An multiple-frequency-modulation type mode-locked laser device according to claim 1, wherein said driving signal generation means includes at least two oscillators which oscillate at mutually different frequencies, a frequency multiplier for multiplying a frequency of an output of at least one of said oscillators by an integer greater than or equal to 2, and a mixer for generating a frequency-mixed driving signal mixed from the outputs of said oscillators and the outputs of said frequency multiplier.

9. A multiple-frequency modulation type mode-locked laser device according to claim 1, wherein said driving signal generation means includes at least two oscillators which oscillate at mutually different frequencies, a frequency divider for dividing a frequency of an output of at least one of said oscillators by an integer greater than or equal to 2, and a mixer for generating a frequency-mixed driving signal mixed from the outputs of said oscillators and outputs of said frequency divider.

10. A multiple-frequency-modulation type mode-locked laser device according to claim 1, wherein an optical filter is provided within said optical cavity for adjusting an oscillation wavelength of the optical cavity so that an oscillation wavelength falls within a gain spectrum width of said optical modulation means.

11. A multiple-frequency-modulation type mode-locked laser device according to claim 1, wherein said driving signal generation means is further provided with a phase adjustment means for adjusting a phase difference between at least two different frequencies mixed in said frequency-mixed driving signal.

* * * * *